Dec. 20, 1932.   E. T. J. TAPP ET AL   1,891,885
REFUSE VEHICLE
Filed Feb. 3, 1932   3 Sheets-Sheet 2

INVENTORS
Ernest T. J. Tapp
Harold Craske
BY
ATTORNEY

Dec. 20, 1932. E. T. J. TAPP ET AL 1,891,885
REFUSE VEHICLE
Filed Feb. 3, 1932 3 Sheets-Sheet 3
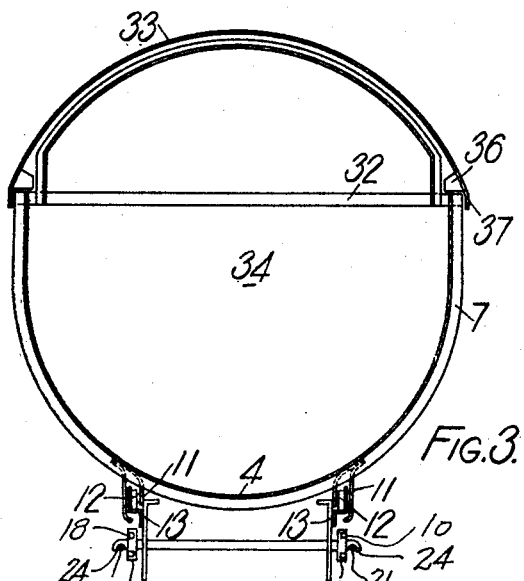
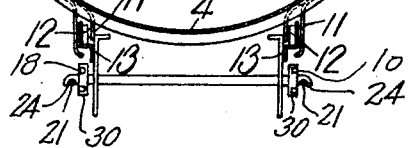
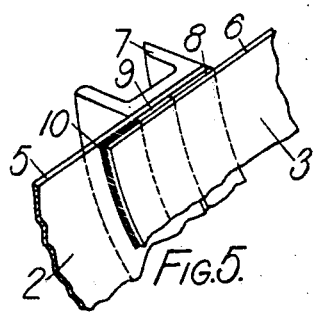
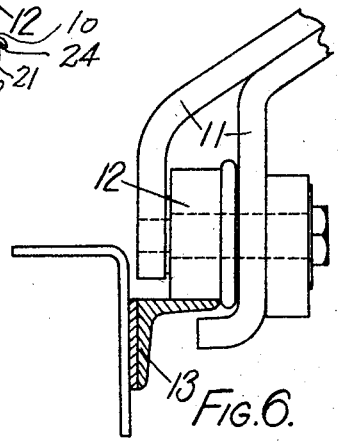
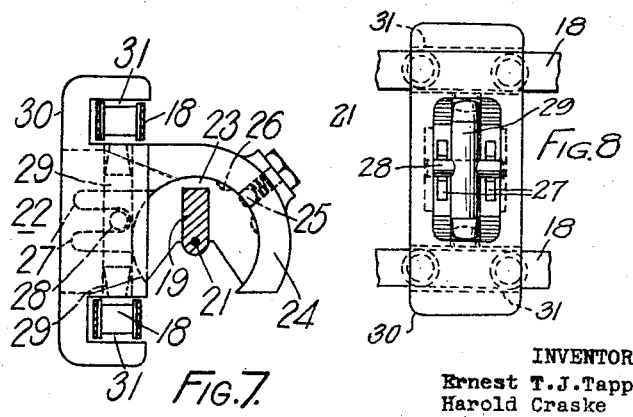
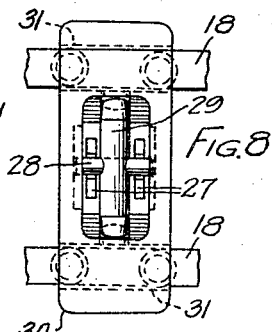
INVENTORS
Ernest T.J.Tapp
Harold Craske
BY
ATTORNEY

UNITED STATES PATENT OFFICE

ERNEST THOMAS JAMES TAPP AND HAROLD CRASKE, OF LONDON, ENGLAND

REFUSE VEHICLE

Application filed February 3, 1932, Serial No. 590,760, and in Great Britain January 13, 1931.

This invention relates to freight vehicles and more particularly but not exclusively to that type of vehicle used for the collection of house refuse or for granular or pulverulent substances or loose material or compressible objects.

Freight vehicles have been previously proposed having longitudinally travelling floors of the endless band or roller blind or slatted band types or consisting of a plurality of rotatable rollers. Such arrangements are in general undesirably complicated and expensive, and unsuitable for some classes of material and are mostly neither sufficiently rugged nor reliable.

An object of the invention is to produce a vehicle body of simple, cheap and rugged construction and which can be loaded with house refuse or other loose material from its rear end. The invention provides moreover a vehicle body in which the load can be readily compressed and from which the load may be readily ejected and having a low loading level.

According to the invention the vehicle body is provided with a longitudinally movable floor consisting essentially of several segments movable relatively to one another and adapted to be stacked at the rear of the vehicle and to be moved forward consecutively during loading to form eventually a full length floor. One of the several segments can, of course, be fixed at the rear of the body. Preferably the uppermost segment is caused to move forward first to its full extent whereupon the segment beneath commences to move, and so on, until the segments are spread out behind each other forming the complete floor. Means, such as rollers, are preferably provided to reduce the friction between the floor segments, as they are extended while being loaded.

Preferably the uppermost segment, which moves first when the floor is extended, is provided at its forward end with a rigid cross partition or bulkhead which forms the effective front of the body at the commencement of and during loading and at the completion of full loading. Preferably, although not essentially, the several floor segments have sides, which furthermore may be roofed over so that in effect the segments telescope into one another. Thus the segments may be of U-section or of rectangular or other straight sided channel section or they may even be cylinders so as to provide an integral roof.

The segments are preferably made of such relative length that, when they are all fully stacked or telescoped, their forward edges are progressively in advance of one another with the uppermost segment leading. The leading edge of each segment, which may be reinforced, is preferably supported on one or more rollers or wheels which conveniently run on rails provided for the purpose, so that only the rear portions of the segments bear directly upon one another. With such arrangement when the segments are loaded the consequent pressure may provide sufficient sealing between segments for most materials. However sealing means such as strips of felt, fabric, leather or similar material may be secured to the under sides of the movable segments adjacent their rear ends. Such sealing strip may be combined with a metal strip which takes the weight.

In some cases it may be found convenient to set the body of the chassis at an angle with the floor or road level, namely with the rear lower than the front.

Except for small vehicles for carrying light material it is necessary to provide mechanism for moving the segments, which may assume various forms of which the following is a mere example:—

An endless chain is provided along each side of the body and carried upon sprocket wheels of which the pair at the front or rear or intermediately can be rotated such as from the vehicle engine. A catch block is provided having a finger which is constrained for movement so that it can be caused to engage or disengage as desired the endless chain so that upon rotation of one of the pairs of sprocket wheels the floor segments can be moved one at a time as required during the loading of the body of the vehicle. The aforesaid finger is preferably operable from the rear and/or front of the vehicle such as from the driver's cab. The driving sprockets may be connected with the vehicle engine through a reversing gear but a cheaper arrangement comprises a catch block having a double-ended finger movable so as to engage alternatively the one or the other of the two parallel portions of each chain so as to be moved by the chain in either direction as desired.

It will be appreciated that with the arrangement of segmental floor and bulkhead above set forth it is possible not only to compress the load if required but also to eject it through a rear door, namely, by returning the movable floor segments towards or to, respectively, the fully stacked position. To assist in ejecting the last portion of the load the bulkhead may be sloping or an auxiliary removable sloping bulkhead may be provided. When it is required that the load can be compressed as above set forth the rear door is so made and fastened that it will withstand the required pressure. To this end the door may be locked for example by a plurality of latches distributed around its edge and preferably provided with means permitting their simultaneous operation.

A rail or the equivalent may be provided on the outside of the door or elsewhere at the rear of the vehicle to facilitate the loading of the vehicle body with refuse and the like.

The body may be entirely covered over, such as by a fixed arched roof, except for an opening of appropriate size at the rear to permit loading which opening is separate from the opening for the aforesaid door.

Each movable floor segment including the movable sides, if any, may have a small downward or outwardly extending lip at its rear edge whilst the front edge of each segment except that which moves first from the stacked position, may have a small upwardly or inwardly extending lip so that as each segment is moved forward a distance equal to its length it will engage the next segment and drag the latter forward. The forward lip is preferably shallower than the rear lip so that the latter does not make contact with the segment, thereby giving the body some flexibility to allow for chassis distortion.

Wipers such as of leather, rubber or brush form may be secured to the edges of the floor segments to prevent or reduce the passage of loaded material through the movable floor.

There may be a flat roof beneath an arched roof to provide additional carrying space.

To enable the invention to be clearly understood it will now be described with reference to the accompanying drawings in which:

Fig. 3 is a section on the line III, III of Fig. 1 of the body portion only of the vehicle.

Figs. 5, 6 and 7 are views of details on an enlarged scale.

Fig. 8 is a view in elevation of the catch block shown in Fig. 7 as viewed from the left in Fig. 7.

Figure 2:
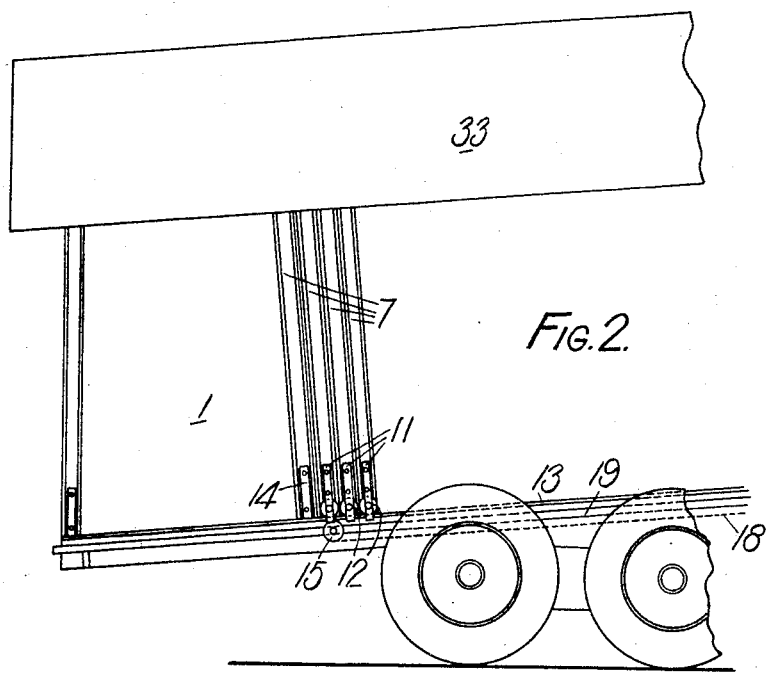
Fig. 2 is a side view of the rear portion of the freight vehicle shown in Fig. 1 and indicating the segments in the fully stacked position.

In the drawings the floor or body segments of the vehicle are indicated respectively at 1, 2, 3 and 4, that is to say, there is the fixed rear segment 1 and three movable segments 2, 3 and 4 which telescope into one another and into the fixed segment 1 so as to become stacked together as shown in Fig. 2, the segments in the example illustrated being of U-section, as will be clearly understood by reference to Fig. 3, that is to say the floor segments have integral sides.

Each segment comprises a main sheet-metal portion as indicated at 5 and 6 for the segments 2 and 3 respectively. To the forward extremity of each sheet-metal portion, such as the portion 5 in Fig. 5 is secured externally a rigid U-shaped member 7 which is conveniently of channel section, although obviously it may assume other forms in cross-section. Within and at the forward extremity of the segment 2 is rigidly secured a metal strip 8 whilst at a short distance from the rear extremity of the next segment 3 is secured an external metal strip 9 the latter being thicker than the strip 8 so that, when the segment 3 has been moved forward a distance substantially equal to its own length, the strip 9 of said segment will engage against the strip 8 of the segment 2 to move the latter forward as the segment 3 is further advanced. A strip 10 of felt, leather, rubber or similar material may be secured to the outer surface of each of the movable segments at the rear extremity of the latter for preventing passage of the pulverulent or granular contents of the vehicle body between the segments, as will be readily appreciated from an inspection of Fig. 5.

The stiffening member 7 of each movable floor or body segment has two brackets 11 extending downwardly therefrom, and a flanged roller 12, mounted between said brackets, is adapted to run upon a rail 13 secured longitudinally along a side of the vehicle chassis, as will be readily apparent from an inspection of Figs. 1, 2, 3 and 6 of the accompanying drawings. The stiffening member 7 of the rearmost segment 1 is provided with two brackets 14 which are respectively rigidly secured to the rails 13, which latter are conveniently in the form of angle iron, as clearly indicated in Figs. 3 and 6.

Figure 1:
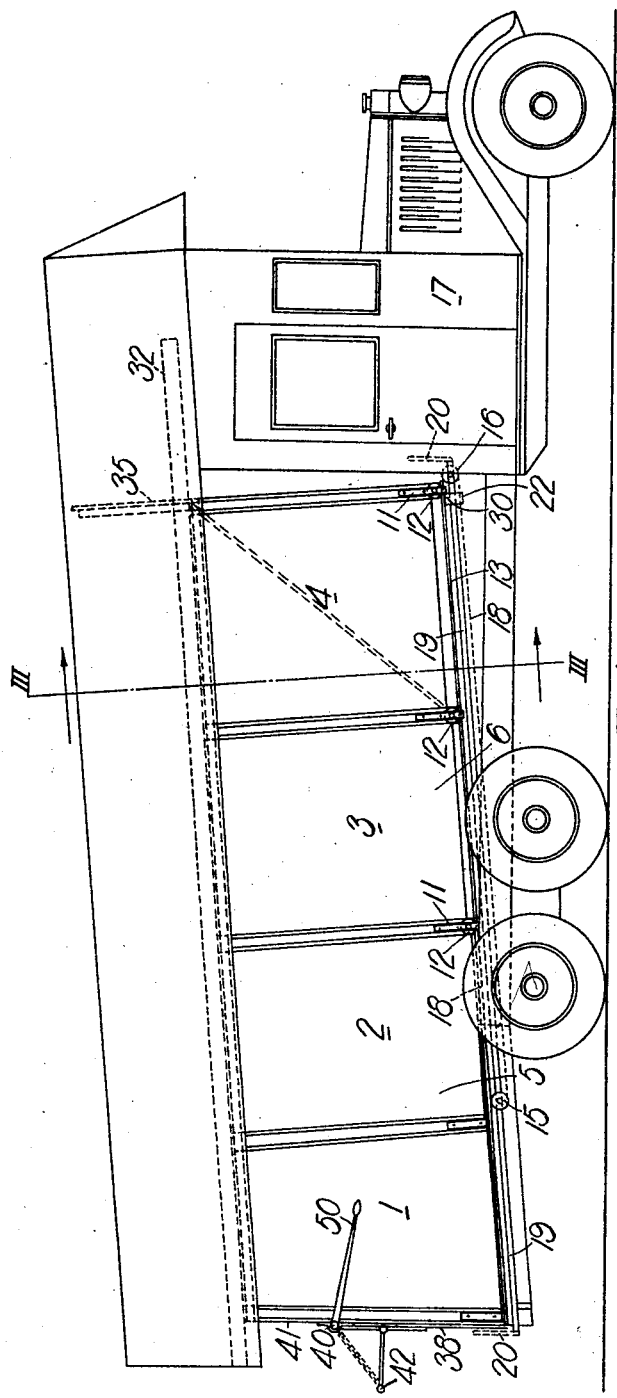
Fig. 1 is a side view of a substantially complete freight vehicle in accordance with the invention and given by way of example only, the segments of the body being shown in the fully opened out or full capacity position.

Adjacent the forward end of the rear segment 1 is mounted on a horizontal transverse shaft which carries a sprocket wheel 15 at each of its ends, whilst at the front of the vehicle is a similar pair of sprocket wheels indicated at 16 (see Fig. 1), the latter sprocket wheels being mounted on a shaft which is adapted to be rotated from the engine of the vehicle by any suitable driving means controlled preferably from the driver's cab 17. Around the sprockets 15 and 16 at each side of the body is an endless sprocket chain, indicated by dotted lines at 18 in Figs. 1 and 2, whilst such chain is shown in transverse section at 18 in Fig. 7. It is assumed that the driving means for the sprockets 16 cause the rotation of the latter in one direction only, namely clockwise as seen in Fig. 1, so that the upper stretch of the chain 18 travels to the right whilst the lower stretch of said chain travels to the left. Rotatably mounted adjacent each chain 18 is a longitudinal bar 19 (Figs. 1, 2, 4 and 7) having at each end a handle 20 so that the bar can be rocked about an axis 21 (Fig. 7). Longitudinally slidable upon the bar 19 is a catch block 22 shown in operative position on the vehicle in Fig. 1 and shown separately as an enlarged end view in Fig. 7. The catch block 22 comprises a slide 23 which is rotatable in a bearing member 24, the members 23 and 24 having a three-position stop or accentuating device of well known form comprising a spring-pressed ball 25 adapted to engage in any one of three notches 26 according to the position to which the slide member 23 is rotated within the bearing member 24 by rotation of the bar 19 by one or other of the handles 20, one of which latter it will be observed is located within the cab 17. The slide member 23 has secured to it or integral with it a forked lever 27 which is adapted to engage a pin 28 on a double-ended finger member 29 which is slidably mounted in a carrier member 30 secured to or integral with the bearing member 24. The carrier member 30 is provided with upper and lower recesses 31 which respectively embrace the upper and lower stretches of the chain 18. From an inspection of Fig. 7 it will be readily appreciated that when the bar 19 is rocked from one side to the other of its illustrated neutral position, the upper end or the lower end of the finger member 29 will be caused to engage a link of the upper or lower stretch of the chain 18 so that, if the sprocket 16 is being rotated, the carrier member 30 will be caused to travel forwards or backwards. The carrier member 30 may be rigidly secured to the bracket 11 of the front segment 4, in which position it is shown in Fig. 1, for moving the segments in the forward direction. However, the catch block 22 need not be secured to the bracket 11 but may engage either the forward or the rear side of any of the brackets 11 of the segments 2, 3 and 4, the construction illustrated in Fig. 7 being such that said catch block will inherently retain itself in position, the flexibility or whip of the chain 18 however permitting the block 22 to be moved longitudinally to another position, for example into position to engage the forward side of the bracket 11 on the segment 2 so that by rocking the bar 19 in the opposite direction (to the left in Figure 7), the segment 2 may be driven back into the fixed segment 1, carrying with it the segments 3 and 4 which may then be consecutively dealt with in a similar manner.

The vehicle is shown with a double roof, namely, a flat roof 32 (Figs. 1 and 3) and an arched roof 33 (Figs. 1, 2, 3 and 4). The space between the roofs 32 and 33 may be utilized as extra carrying space in the vehicle for articles such as for dustbins, boxes or other containers, or such implements as spades or brooms.

The cross-partition or bulk head on the front segment member 4 is illustrated only in Fig. 3, namely, at 34. As hereinbefore set forth, and as indicated in broken lines in Figure 1, the bulk head may be inclined or an auxiliary inclined bulk head may be provided to facilitate ejection of the load. To increase the capacity of the vehicle for certain materials, such as house refuse or waste paper, the flat roof 32 may be omitted and the bulk head 34 may be extended into the arched roof 33 as indicated at 35 in Fig. 1, the arched roof 33 being mounted on longitudinal battens 36 and having dependent portions 37 so as to provide a reasonably good closure between the segments 1—4 and the arched roof 33.

Figure 4:
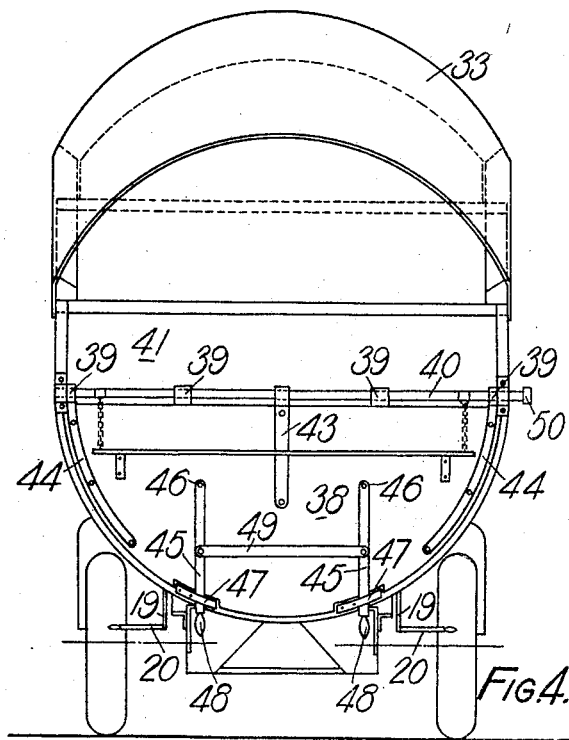
Fig. 4 is a rear view of the vehicle shown in Fig. 1.

In Figs. 1 and 4 one form of door is shown by way of example namely a door 38 of semi-circular shape carried at its diameter by members 39 on a hinge bar 40 rotatably mounted across the rear of the vehicle and the space between the upper edge of said door and the roof may be left open, as at 41, to permit refuse or other material to be shot into the rear end of the body, and to facilitate such loading a hinged rail 42 may be provided. The door 38 is of the compression type and is for this purpose stiffened by members such as 43 and 44 riveted thereon, and is secured in closed position by means of levers 45 pivoted to the door at 46 engaging catches 47 carried by the rear end of the segment 1, the levers having handles 48 and being linked together by a cross-member 49. It will be appreciated that the levers 45 with the cross-member 49 also serve to stiffen the door 38 when the latter is locked in the closed position.

A hand-lever 50 may be secured to the bar 40 for opening the door if required.

It will be noticed that the segmental body is inclined as a whole to the road level so as to give a low loading level at the rear. Such inclination will also facilitate unloading.

It will be understood that various modifications may be made without departing from the scope of the invention.

We claim:—

1. A freight vehicle body comprising a plurality of substantially similar floor segments longitudinally movable relatively to one another for stacking upon one another to provide a minimum freight space and for extension to provide a greater freight space, an endless flexible member movable in parallel stretches longitudinally of said body, and means carried by one of said segments and operable from one end of said body for connecting such segment to either stretch of said flexible member.

2. A freight vehicle body comprising a plurality of substantially similar floor segments of which one is fixed and the others are longitudinally and substantially horizontally movable with respect to the fixed segment and to one another so that the segments may be stacked upon one another and may also be drawn out to extend the freight space, a cross-partition at the leading end of the segment which is uppermost when said floor segments are in the stacked position, a flexible endless member movable longitudinally of said body, and means including a rock shaft operable from one end of said body for connecting said uppermost segment to and disconnecting it from said flexible member.

3. A freight vehicle body comprising a plurality of substantially similar floor segments, of which one is fixed and the others are longitudinally and substantially horizontally slidable relatively to said fixed segment and to one another, a flexible endless member movable longitudinally of the body, and means for connecting said endless member with a floor segment for causing the latter to be moved when desired, said last named means including a rock-shaft operable from one end of said body.

4. A freight vehicle body comprising a plurality of substantially similar floor segments, of which one is fixed and the others are longitudinally and substantially horizontally slidable relatively to said fixed segment and to one another, a flexible endless member movable in parallel stretches longitudinally of the body, and means for selectively connecting a floor segment with either parallel stretch of said endless travelling member for moving said segment in either direction.

5. A freight vehicle body comprising a plurality of substantially similar floor segments, of which one is fixed and the others are longitudinally and substantially horizontally slidable relatively to said fixed segment and to one another, a flexible endless member movable in parallel stretches longitudinally of the body, a catch-block carried by a floor segment, a finger member movable in said catch-block and engageable with either parallel stretch of said endless member, and means operable by hand from at least one end of the body for moving said finger member.

In testimony whereof we have hereunto subscribed our names this 22nd day of January, 1932.

ERNEST THOMAS JAMES TAPP.
HAROLD CRASKE.